United States Patent
Nishimura et al.

(10) Patent No.: US 11,361,687 B2
(45) Date of Patent: Jun. 14, 2022

(54) ADVERTISEMENT DISPLAY DEVICE, VEHICLE, AND ADVERTISEMENT DISPLAY METHOD

(71) Applicant: TOYOTA JIDOSHA KABUSHIKI KAISHA, Toyota (JP)

(72) Inventors: Kazuya Nishimura, Okazaki (JP); Naoki Uenoyama, Nisshin (JP); Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/802,848

(22) Filed: Feb. 27, 2020

(65) Prior Publication Data
US 2020/0294432 A1    Sep. 17, 2020

(30) Foreign Application Priority Data
Mar. 12, 2019   (JP) .............................. JP2019-044909

(51) Int. Cl.
*G06Q 30/00* (2012.01)
*G09F 21/04* (2006.01)
*G06Q 30/02* (2012.01)

(52) U.S. Cl.
CPC ....... *G09F 21/048* (2013.01); *G06Q 30/0265* (2013.01); *G06Q 30/0266* (2013.01); *G06Q 30/0267* (2013.01); *G06Q 30/0272* (2013.01); *G06Q 30/0273* (2013.01)

(58) Field of Classification Search
CPC .............. G09F 21/048; G06Q 30/0265; G06Q 30/0273; G06Q 30/0272; G06Q 30/0266; G06Q 30/0267
See application file for complete search history.

(56) References Cited

U.S. PATENT DOCUMENTS

| | | | | |
|---|---|---|---|---|
| 5,150,116 A | * | 9/1992 | West | G08G 1/095 340/928 |
| 2003/0128135 A1 | * | 7/2003 | Poltorak | G08G 1/081 340/906 |
| 2008/0319648 A1 | * | 12/2008 | Poltorak | G08G 1/0969 701/423 |
| 2009/0150242 A1 | * | 6/2009 | Del Cogliano | G06Q 30/0265 705/14.62 |
| 2009/0279839 A1 | * | 11/2009 | Nakamura | H04N 5/76 386/353 |

(Continued)

FOREIGN PATENT DOCUMENTS

| CN | 101444003 A | 5/2009 |
|---|---|---|
| CN | 104820934 A | 8/2015 |

(Continued)

*Primary Examiner* — Luis A Brown
(74) *Attorney, Agent, or Firm* — Oliff PLC (57) ABSTRACT

A control device as an advertisement display device that is mountable on a vehicle includes a calculation unit configured to calculate a time for which an occupant of another vehicle is able to visually recognize a video displayed on a display attached to a host vehicle based on a driving state of the host vehicle, and a display controller configured to display an advertisement edited such that a video time corresponds to the visually recognizable time calculated by the calculation unit on the display.

8 Claims, 6 Drawing Sheets

(56) References Cited

U.S. PATENT DOCUMENTS

| | | | | |
|---|---|---|---|---|
| 2009/0299857 | A1* | 12/2009 | Brubaker | G06Q 30/0269 455/99 |
| 2010/0036739 | A2* | 2/2010 | Barlow | G06Q 30/02 705/14.62 |
| 2011/0061275 | A1* | 3/2011 | Ginebra Giudicelli | E01F 9/588 40/564 |
| 2011/0093330 | A1* | 4/2011 | Burckart | G06Q 30/0265 705/14.62 |
| 2012/0089445 | A1* | 4/2012 | Hot | G06Q 30/0241 40/463 |
| 2012/0089462 | A1* | 4/2012 | Hot | G06Q 30/0241 705/14.62 |
| 2013/0013412 | A1* | 1/2013 | Altman | G06Q 30/02 705/14.63 |
| 2015/0220991 | A1* | 8/2015 | Butts | G06Q 30/0265 705/14.62 |
| 2015/0302741 | A1* | 10/2015 | Vala | G08G 1/0965 340/916 |
| 2016/0140613 | A1* | 5/2016 | Kim | H04W 4/70 705/14.63 |
| 2018/0088991 | A1* | 3/2018 | Morris | G06F 9/5027 |
| 2018/0285931 | A1* | 10/2018 | Dawson | G06Q 30/0269 |
| 2019/0005812 | A1* | 1/2019 | Matus | G06V 20/584 |
| 2019/0026779 | A1* | 1/2019 | DeLucia | G09G 5/003 |
| 2019/0130800 | A1* | 5/2019 | Kagawa | G06Q 30/0265 |
| 2019/0156714 | A1* | 5/2019 | Isgar | G08G 1/093 |
| 2019/0163429 | A1* | 5/2019 | Hot | G06F 3/147 |
| 2020/0058054 | A1* | 2/2020 | Ryu | G09F 21/04 |
| 2020/0143674 | A1* | 5/2020 | Wölfl | G08G 1/0129 |
| 2020/0174737 | A1* | 6/2020 | Gusikhin | G06F 3/165 |
| 2020/0294432 | A1* | 9/2020 | Nishimura | G09F 21/048 |

FOREIGN PATENT DOCUMENTS

| | | | | |
|---|---|---|---|---|
| CN | 106931980 | A | 7/2017 | |
| CN | 107665580 | A | 2/2018 | |
| CN | 108269395 | A | 7/2018 | |
| JP | 2017-185846 | A | 10/2017 | |
| JP | 2017185846 | A * | 10/2017 | B60R 13/00 |
| WO | 2007/109541 | A2 | 9/2007 | |
| WO | WO-2011163006 | A1 * | 12/2011 | G01C 21/3492 |
| WO | 2018/215419 | A1 | 11/2018 | |

* cited by examiner

ADVERTISEMENT DISPLAY DEVICE, VEHICLE, AND ADVERTISEMENT DISPLAY METHOD

INCORPORATION BY REFERENCE

The disclosure of Japanese Patent Application No. 2019-044909 filed on Mar. 12, 2019 including the specification, drawings and abstract is incorporated herein by reference in its entirety.

BACKGROUND

1. Technical Field

The disclosure relates to an advertisement display device, a vehicle, and an advertisement display method.

2. Description of Related Art

Japanese Unexamined Patent Application Publication No. 2017-185846 (JP 2017-185846 A) discloses an in-vehicle display device that is mounted on a side surface of a vehicle and displays an advertisement on the outside. The in-vehicle display device displays the advertisement with a scroll image when the vehicle is stopped and displays the advertisement with a still image when the vehicle is moving. When the moving vehicle stops, a continuation of the scroll image displayed when the vehicle is stopped last time is displayed.

SUMMARY

By the way, an advertisement effect on a viewer can be enhanced by displaying an advertisement with a moving image rather than displaying the advertisement with a still image. However, a time for which vehicles traveling on roads can travel side by side, front and rear or right and left, is not uniform due to different turning places of the vehicles, and the presence or absence of waiting for a traffic signal, a flow difference of the vehicles in each traveling lane, or the like. Therefore, solely a part of the advertisement may be viewed even when the advertisement is displayed as the moving image. When solely a part of the advertisement is viewed, it is not possible to sufficiently transmit contents desired to be advertised to the viewer and thus it becomes difficult to enhance the advertisement effect.

Therefore, the disclosure provides an advertisement display device, a vehicle, and an advertisement display method capable of transmitting contents desired to be advertised to a target viewer.

An advertisement display device according to an aspect of the disclosure is an advertisement display device that is mountable on a vehicle. The device includes a calculation unit configured to calculate a time for which an occupant of another vehicle is able to visually recognize a video displayed on a display attached to a host vehicle based on a driving state of the host vehicle, and a display controller configured to display an advertisement edited such that a video time corresponds to the visually recognizable time calculated by the calculation unit on the display.

In the above aspect, the display may be attached to at least a rear surface of the host vehicle. The calculation unit may calculate the visually recognizable time based on a time for which the host vehicle stops at a traffic signal that causes a stop state when the driving state of the host vehicle shifts to the stop state. The display controller may display the advertisement on the display attached to the rear surface of the host vehicle when the driving state of the host vehicle shifts to the stop state.

In the above aspect, the calculation unit may calculate the time for which the host vehicle stops at the traffic signal based on information acquired by road-to-vehicle communication with a roadside device corresponding to the traffic signal when the driving state of the host vehicle shifts to the stop state.

In the above aspect, the calculation unit may calculate the time for which the host vehicle stops at the traffic signal based on information acquired from a server that manages an operation history of the traffic signal when the driving state of the host vehicle shifts to the stop state.

In the above aspect, the display controller may stop displaying the advertisement on the display when there is no other vehicle in a range where the advertisement to be displayed on the display attached to the rear surface of the host vehicle is visually recognizable.

In the above aspect, the advertisement display device may further include a detector configured to detect another vehicle that is likely to travel in parallel with the host vehicle. The display may be attached to at least a side surface of the host vehicle. The calculation unit may calculate the visually recognizable time based on a relative speed of the host vehicle with another vehicle detected by the detector when the driving state of the host vehicle is a traveling state. The display controller may display the advertisement on the display attached to the side surface of the host vehicle when the driving state of the host vehicle is the traveling state.

In the above aspect, the detector may detect another vehicle that is likely to travel in parallel with the host vehicle and has a plurality of occupants based on information acquired by vehicle-to-vehicle communication with another vehicle.

In the above aspect, the advertisement display device may further include an imaging unit configured to capture a periphery of the host vehicle. The detector may recognize an image captured by the imaging unit to detect another vehicle that is likely to travel in parallel with the host vehicle and has a plurality of occupants.

In the above aspect, the calculation unit may calculate a relative speed of the host vehicle with another vehicle based on information acquired by vehicle-to-vehicle communication with another vehicle when the driving state of the host vehicle is the traveling state.

In the above aspect, the display controller may display a still image advertisement on the display when the visually recognizable time is less than a reference time.

A vehicle according to another aspect of the disclosure includes a calculation unit configured to calculate a time for which an occupant of another vehicle is able to visually recognize a video displayed on a display attached to a host vehicle based on a driving state of the host vehicle, and a display controller configured to display an advertisement edited such that a video time corresponds to the visually recognizable time calculated by the calculation unit on the display.

An advertisement display method according to another aspect of the disclosure is an advertisement display method executed by a processor that is mountable on a vehicle. The method includes calculating a time for which an occupant of another vehicle is able to visually recognize a video displayed on a display attached to a host vehicle based on a driving state of the host vehicle by a calculation unit, and displaying an advertisement edited such that a video time corresponds to the visually recognizable time calculated by the calculation unit on the display, by a display controller.

According to the disclosure, it is possible to provide the advertisement display device, the vehicle, and the advertisement display method capable of transmitting the contents desired to be advertised to the target viewer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Preferred embodiments of the disclosure will be described with reference to accompanying drawings. In each drawing, elements to which the same reference numeral is assigned have the same or similar configuration.

First Embodiment

A configuration of an advertisement display system including a control device which is an advertisement display device according to a first embodiment will be described with reference to FIG. 1. An advertisement display system 1 is a system mounted on a vehicle and includes, for example, a control device (advertisement display device) 2, a monitoring unit 3, and a display 4. Each constituent element is connected, for example, through a communication bus and is configured to be able to communicate with each other.

Figure 2:
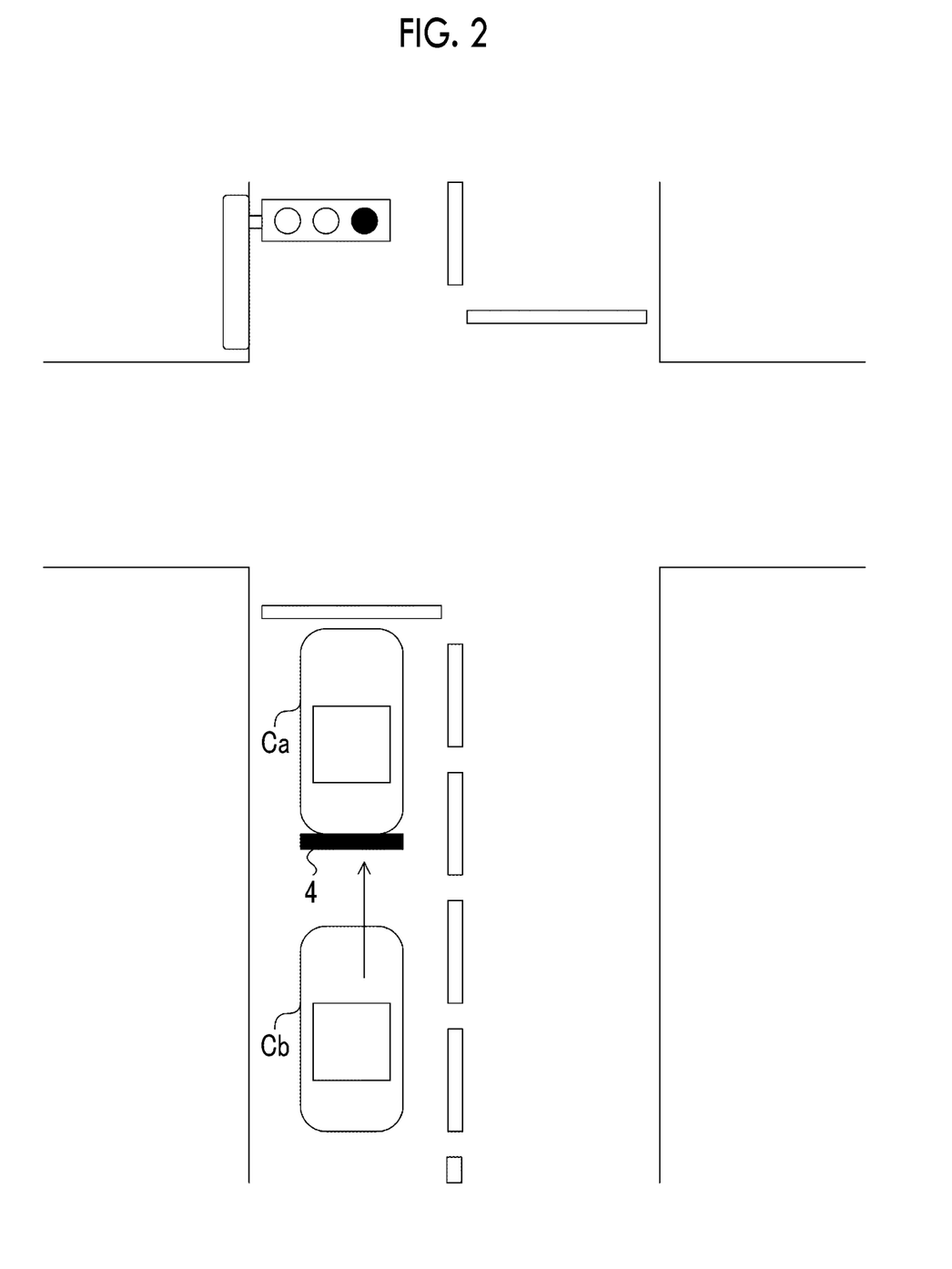
FIG. 2 is a schematic diagram for describing a concept of a function realized by the advertisement display system shown in FIG. 1.

As illustrated in FIG. 2, the advertisement display system 1 according to the first embodiment displays an advertisement edited to a length that can be viewed by an occupant of following another vehicle Cb within a stop time when a host vehicle Ca stops at a traffic signal (red signal) on the display 4 attached to a rear surface of the host vehicle Ca to cause the occupant of another vehicle Cb to view the advertisement. Details of such an advertisement display system 1 will be described below.

Figure 1:
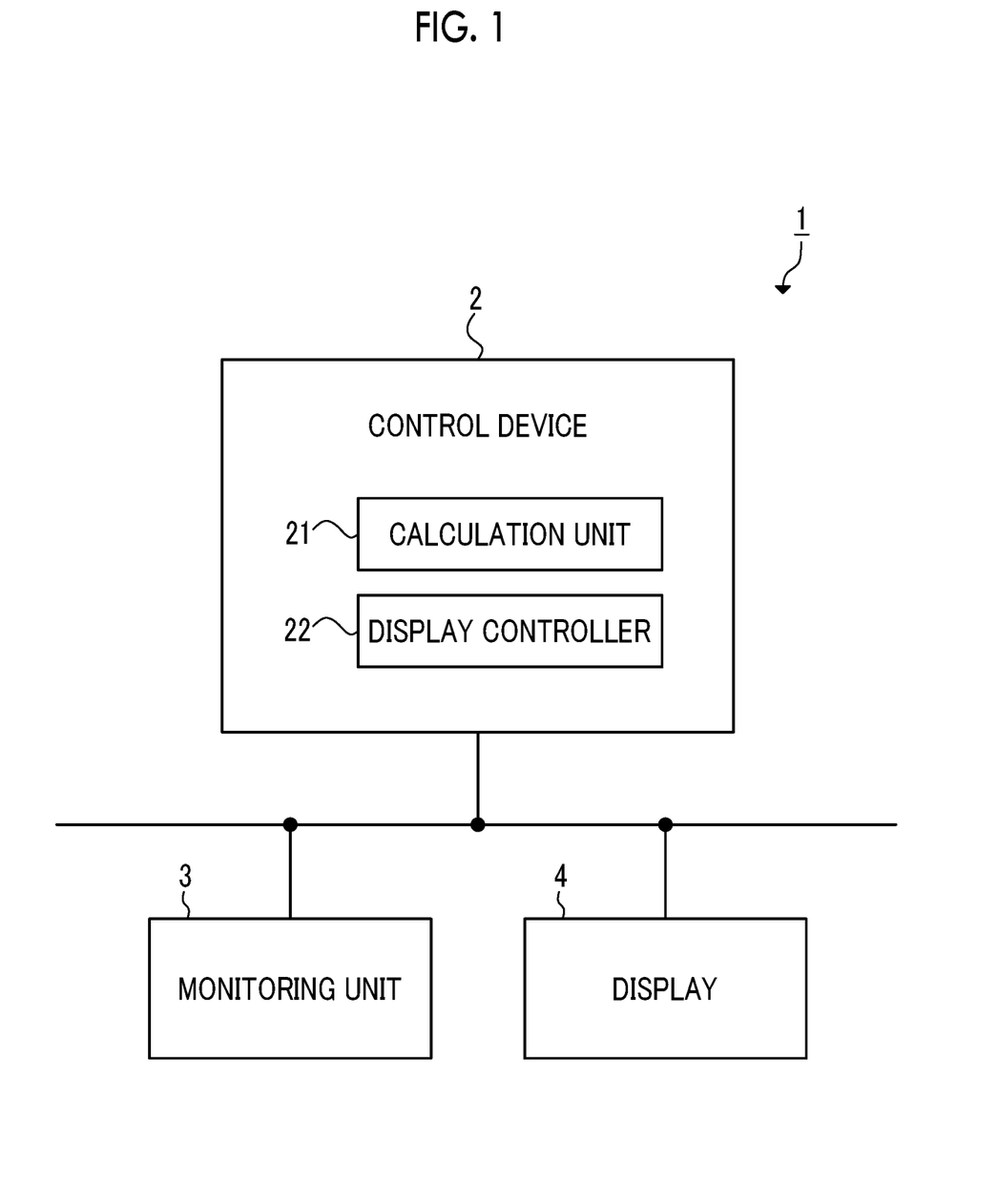
FIG. 1 is a diagram illustrating a configuration of an advertisement display system including a control device which is an advertisement display device according to a first embodiment.

A control device 2 in FIG. 1 is configured to include, for example, a controller including a central processing unit (CPU) and a memory, an operation unit, and a communication device as a physical configuration. The CPU executes a predetermined program stored in the memory to realize an advertisement display function described below and the like.

The monitoring unit 3 is configured of various devices for monitoring a situation around the vehicle. Examples of the various devices include an image sensor, a camera, a millimeter wave radar, a light detection and ranging (LiDAR), a gyro sensor, an acceleration sensor, and a geomagnetic sensor in addition to a vehicle-to-vehicle communication device and a road-to-vehicle communication device.

The vehicle-to-vehicle communication device is a wireless communication device that performs bidirectional wireless communication with another vehicle existing around the host vehicle as needed to exchange vehicle information and the like with each other. Examples of the vehicle information include vehicle body information, position information, and traveling information. An example of the vehicle body information includes information such as a vehicle type and a vehicle body size. An example of the position information includes information such as latitude and longitude measured by a global positioning system (GPS). An example of the traveling information includes information such as a speed and acceleration.

The road-to-vehicle communication device performs the wireless communication with a roadside device to receive information detected by the roadside device (hereinafter also referred to as "roadside information"). The roadside device according to the first embodiment is exemplarily installed in association with the traffic signal.

The display 4 is a display device and displays, for example, a character, an image, and a moving image. The display 4 according to the first embodiment is exemplarily attached to the rear surface of the vehicle.

The control device 2 has advertisement display functions such as a calculation unit 21 and a display controller 22. The advertisement display function will be described below.

The calculation unit 21 calculates a time for which the host vehicle stops at the traffic signal that causes a stop state when a driving state of the host vehicle shifts to the stop state. Examples of the driving state include the stop state and a traveling state. The time for which the host vehicle stops at the traffic signal can be calculated as (1) and (2) below, for example.

(1) Calculate the time for which the host vehicle stops at the traffic signal based on information acquired by road-to-vehicle communication with a roadside device corresponding to a traffic signal. Examples of the information acquired by the road-to-vehicle communication include a continuation time of the red signal at the traffic signal and a stop time caused by congestion around the traffic signal. In the case, the calculation unit 21 sets the time for which the host vehicle stops at the traffic signal to the continuation time of the red signal or a time including a stop time caused by congestion when the congestion occurs to calculate the time for which the host vehicle stops at the traffic signal.

(2) Calculate the time for which the host vehicle stops at the traffic signal based on information acquired from a server that manages an operation history of the traffic signal, a congestion situation near the traffic signal, or the like. An example of the operation history of the traffic signal includes a continuation time of the red signal in the past in the traffic signal. Examples of the congestion situation near the traffic signal include a congestion distance including the periphery of the traffic signal and the time for which the host vehicle stops at the traffic signal caused by the congestion. In the case, the calculation unit 21 sets the time for which the host vehicle stops at the traffic signal to a continuation time of the red signal at a current timepoint or a time including a stop time caused by the latest congestion when the congestion occurs to calculate the time for which the host vehicle stops at the traffic signal.

The calculation unit 21 calculates a time for which an occupant of another vehicle can visually recognize a video displayed on the display 4 based on the calculated time for which the host vehicle stops at the traffic signal (hereinafter also referred to as "visually recognizable time"). The time for which the host vehicle stops at the traffic signal and the visually recognizable time may be the same length or different lengths.

The display controller 22 edits the advertisement such that a video time corresponds to the visually recognizable time calculated by the calculation unit 21. Examples of the editing of the advertisement include cutting and editing a part of the video such that the video time is shortened and editing the contents of the advertisement in accordance with the video time. Alternatively, a plurality of advertisements whose contents are edited in advance in accordance with respective video times may be prepared, and an advertisement edited to a video time corresponding to the visually recognizable time may be selected from the advertisements.

The display controller 22 displays the edited advertisement on the display 4 attached to the rear surface of the host vehicle. The display controller 22 may display a still image advertisement on the display 4 when the visually recognizable time is less than a reference time.

The display controller 22 may stop displaying the advertisement when there is no other vehicle in a range where the advertisement displayed on the display 4 can be visually recognized. Whether or not there is another vehicle in the visually recognizable range can be detected using various devices included in the monitoring unit 3.

Figure 3:
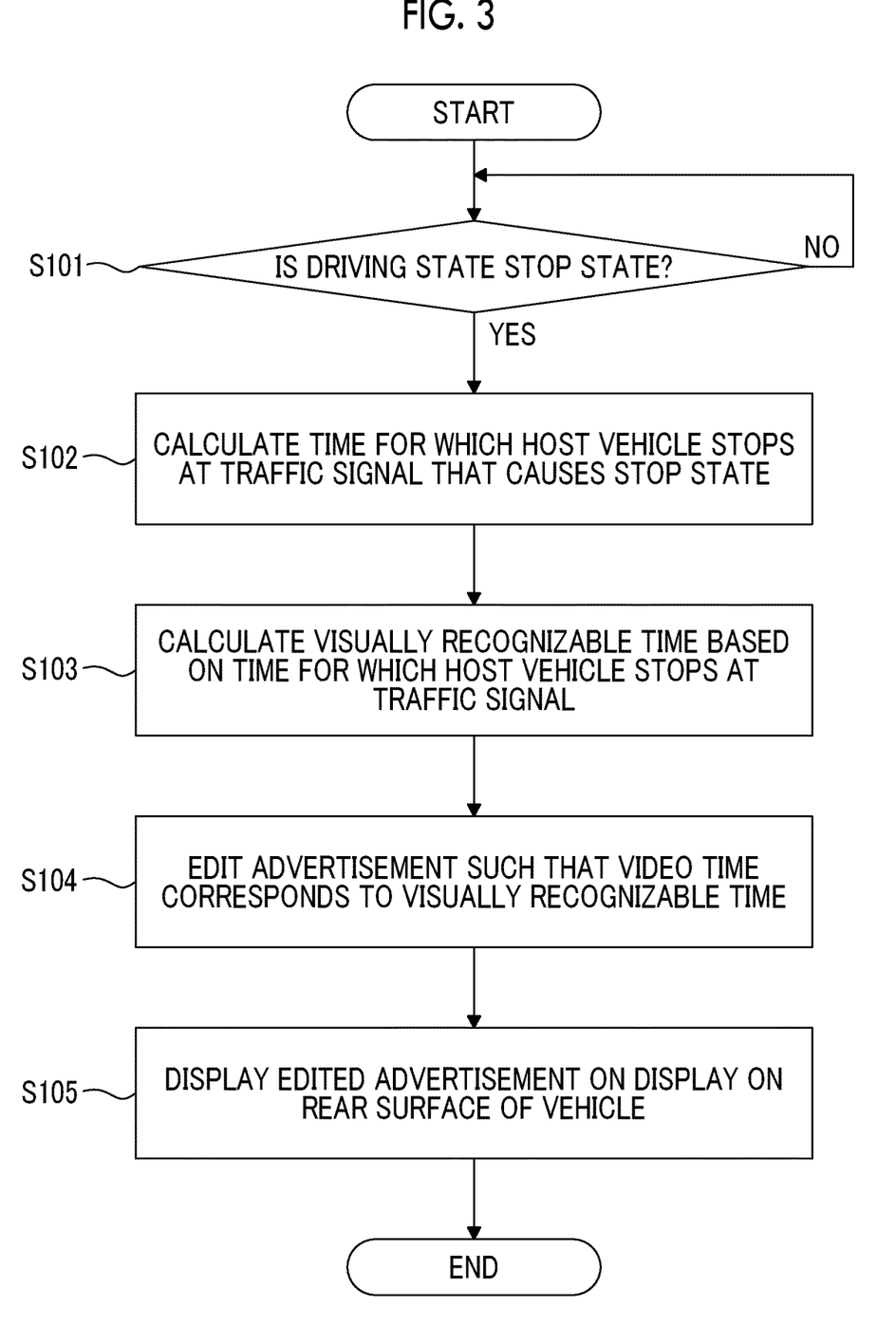
FIG. 3 is a flowchart for describing a procedure of an advertisement display process executed in the control device shown in FIG. 1.

An example of a procedure of an advertisement display process executed in the control device 2 according to the first embodiment will be described with reference to FIG. 3.

First, the calculation unit 21 of the control device 2 determines whether or not the driving state of the host vehicle shifts to the stop state (step S101). When the determination is NO (step S101; NO), the determination is repeated until YES.

When determination is made in step S101 that the driving state shifts to the stop state (step S101; YES), the calculation unit 21 of the control device 2 calculates the time for which the host vehicle stops at the traffic signal that causes the stop state (Step S102).

Subsequently, the calculation unit 21 of the control device 2 calculates the visually recognizable time of the video displayed on the display 4 based on the time for which the host vehicle stops at the traffic signal calculated in step S102 (step S103).

Subsequently, the display controller 22 of the control device 2 edits the advertisement such that the video time corresponds to the visually recognizable time calculated in step S103 (step S104).

Subsequently, the display controller 22 of the control device 2 displays the advertisement edited in step S104 on the display 4 provided on the rear surface of the host vehicle (step S105). Then, the operation ends.

As described above, with the control device 2 according to the first embodiment, it is possible to calculate the visually recognizable time based on the time for which the host vehicle stops at the traffic signal that causes the stop state when the driving state of the host vehicle shifts to the stop state, and to display the advertisement edited such that the video time corresponds to the calculated visually recognizable time on the display provided on the rear surface of the host vehicle. Accordingly, it is possible to cause the occupant of the following vehicle stopping at the traffic signal to view the advertisement edited to match the time for which the host vehicle stops at the traffic signal.

With the control device 2 according to the first embodiment, it is possible to display an advertisement having a length matching a signal waiting time of another vehicle which is a viewing target on the display provided on the rear surface of the host vehicle and thus to transmit the contents desired to be advertised to a target viewer.

Second Embodiment

A configuration of an advertisement display system including a control device which is an advertisement display device according to a second embodiment will be described with reference to FIG. 4. An advertisement display system 1s of the second embodiment is different from the advertisement display system 1 according to the first embodiment described above in the following points. A control device 2s according to the second embodiment further includes a detector 23, and a function of a calculation unit 21s is different. Except for these points, the advertisement display system is is the same as the advertisement display system 1 according to the first embodiment. Therefore, the same reference numerals are assigned to the respective constituent elements, the description thereof is omitted, and the differences from the first embodiment will be mainly described in the following.

Similar to the advertisement display system 1 according to the first embodiment, the advertisement display system 1s according to the second embodiment includes the control device 2s, the monitoring unit 3, and the display 4.

Figure 5:
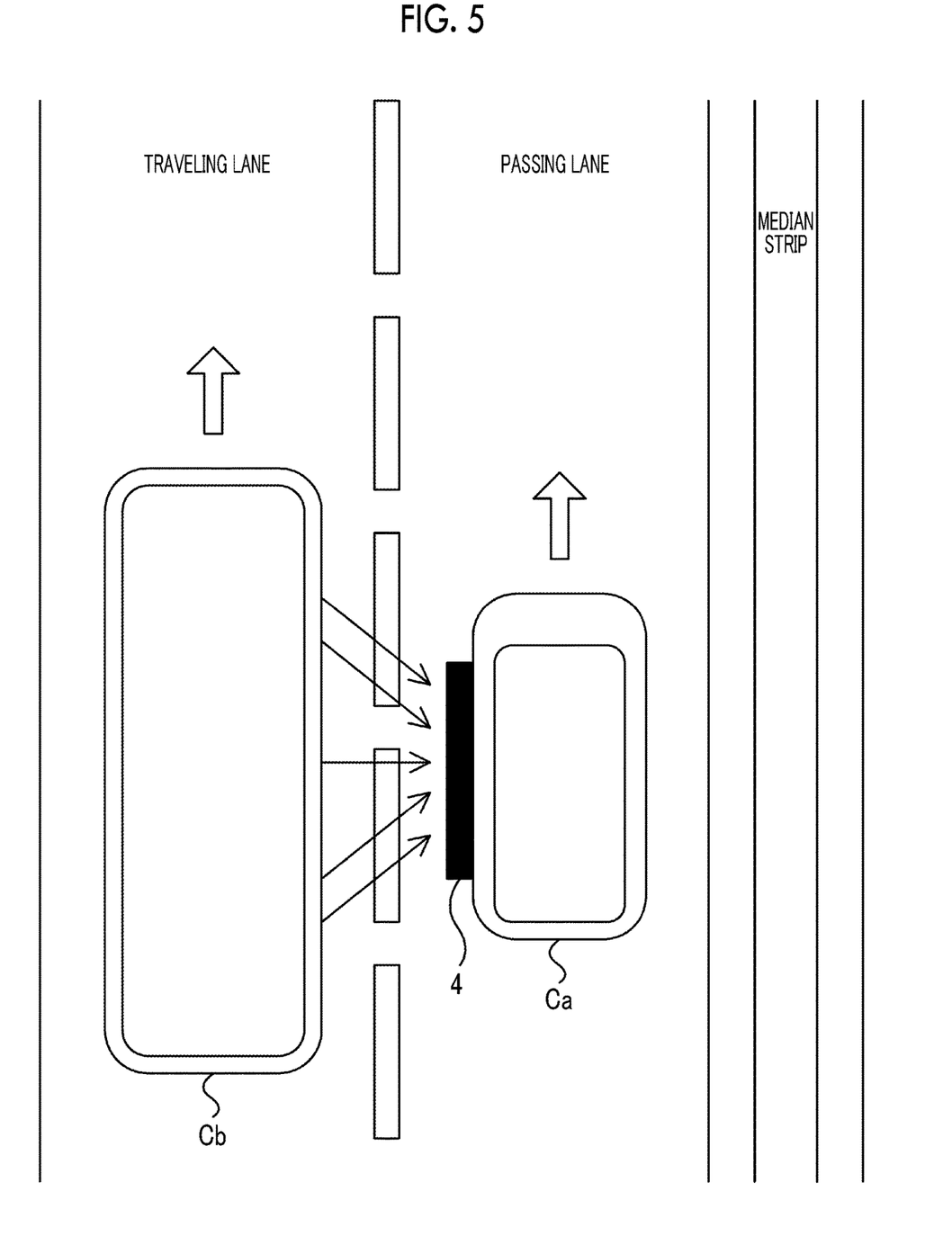
FIG. 5 is a schematic diagram for describing a concept of a function realized by the advertisement display system shown in FIG. 4.

As illustrated in FIG. 5, the advertisement display system 1s according to the second embodiment detects another vehicle Cb that may travel in parallel with the host vehicle Ca and displays an advertisement edited to a length that can be viewed by an occupant of another vehicle Cb during the traveling in parallel on the display 4 attached to a side surface of the host vehicle Ca based on a relative speed with the detected another vehicle Cb to cause the occupant of another vehicle Cb to view the advertisement.

Figure 4:
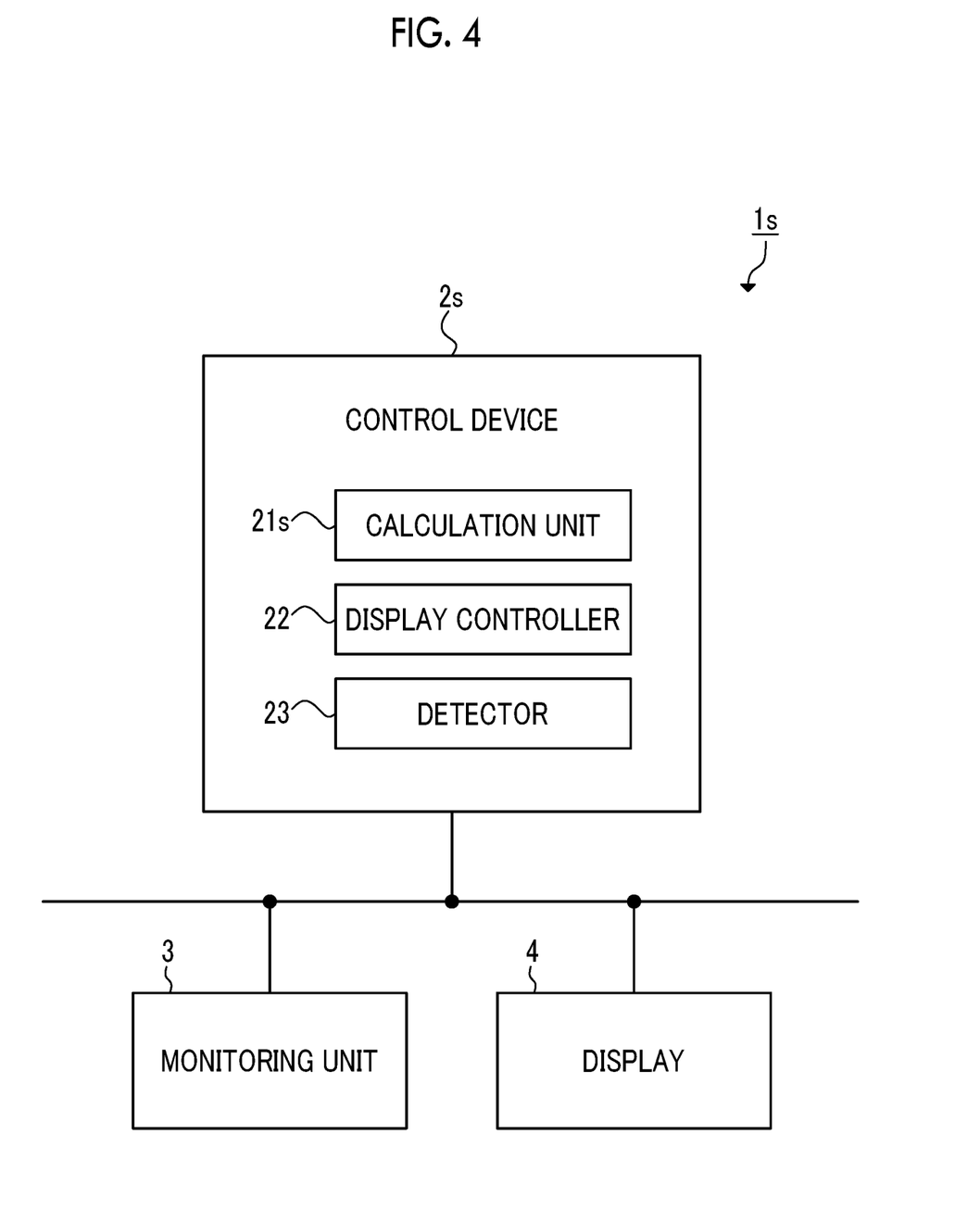
FIG. 4 is a diagram illustrating a configuration of an advertisement display system including a control device which is an advertisement display device according to a second embodiment.

In the second embodiment, the display 4 in FIG. 4 is exemplarily attached to the side surface of the vehicle.

The detector 23 detects another vehicle that may travel in parallel with the host vehicle and has a plurality of occupants based on vehicle information acquired by the vehicle-to-vehicle communication with another vehicle and/or a result of recognizing an image captured by a camera (imaging unit) of the monitoring unit 3.

Here, roadside information acquired by the road-to-vehicle communication with a roadside device may be used when another vehicle is detected. In the case, the roadside device has, for example, a sensor unit and a transmission unit. Examples of the sensor unit include an image sensor, a camera, a millimeter wave radar and detects information on a position, a speed, acceleration, an orientation, and the like of another vehicle traveling on the road as the roadside information. The position of another vehicle traveling on the road can be obtained, for example, by calculating a distance and orientation from a predetermined reference point.

Whether or not there may be a vehicle traveling in parallel with the host vehicle can be determined based on, for example, a speed of another vehicle traveling in a lane different from the host vehicle or a plurality of images obtained by capturing another vehicle, when the host vehicle travels on a road with a plurality of lanes on one side.

Specifically, the detector 23 can determine that there may be a vehicle traveling in parallel with the host vehicle when a speed of another vehicle traveling behind the host vehicle is faster than a speed of the host vehicle or a speed of another vehicle traveling in front of the host vehicle is slower than a speed of the host vehicle based on a speed included in the vehicle information acquired from another vehicle.

The detector 23 can also determine that there may be a vehicle traveling in parallel with the host vehicle when recognition is made that another vehicle traveling behind or in front of the host vehicle approaches the host vehicle based on the images obtained by capturing another vehicle.

Whether or not there is the occupants in another vehicle can be determined based on, for example, the vehicle type included in the vehicle information acquired by the vehicle-to-vehicle communication and/or the image captured by the camera of the monitoring unit 3. Specifically, the detector 23 can determine that there are the occupants in another vehicle when the vehicle type included in the vehicle information is a vehicle type indicating a vehicle on which a passenger gets on such as a bus or a taxi and/or recognition is made that there is a passenger other than a driver as a result of recognizing the captured image.

The calculation unit 21s according to the second embodiment calculates a relative speed (speed difference) of the host vehicle with another vehicle detected by the detector 23 when the driving state of the host vehicle is the traveling state. Specifically, the calculation unit 21s calculates the relative speed of the host vehicle with another vehicle detected by the detector 23 based on the speed of the host vehicle and the speed included in the vehicle information acquired from another vehicle.

The calculation unit 21s calculates a visually recognizable time for which the occupant of another vehicle can visually recognize the video displayed on the display 4 based on the relative speed of the host vehicle with another vehicle. The visually recognizable time can be determined, for example, by calculating a time required for another vehicle detected by the detector 23 to pass through a range in which the advertisement displayed on the display 4 can be visually recognized.

The display controller 22 displays the edited advertisement on the display 4 attached to the side surface of the host vehicle. The display controller 22 according to the second embodiment is the same as the function of the display controller 22 according to the first embodiment except that the disposition place of the display for displaying the advertisement is different.

Figure 6:
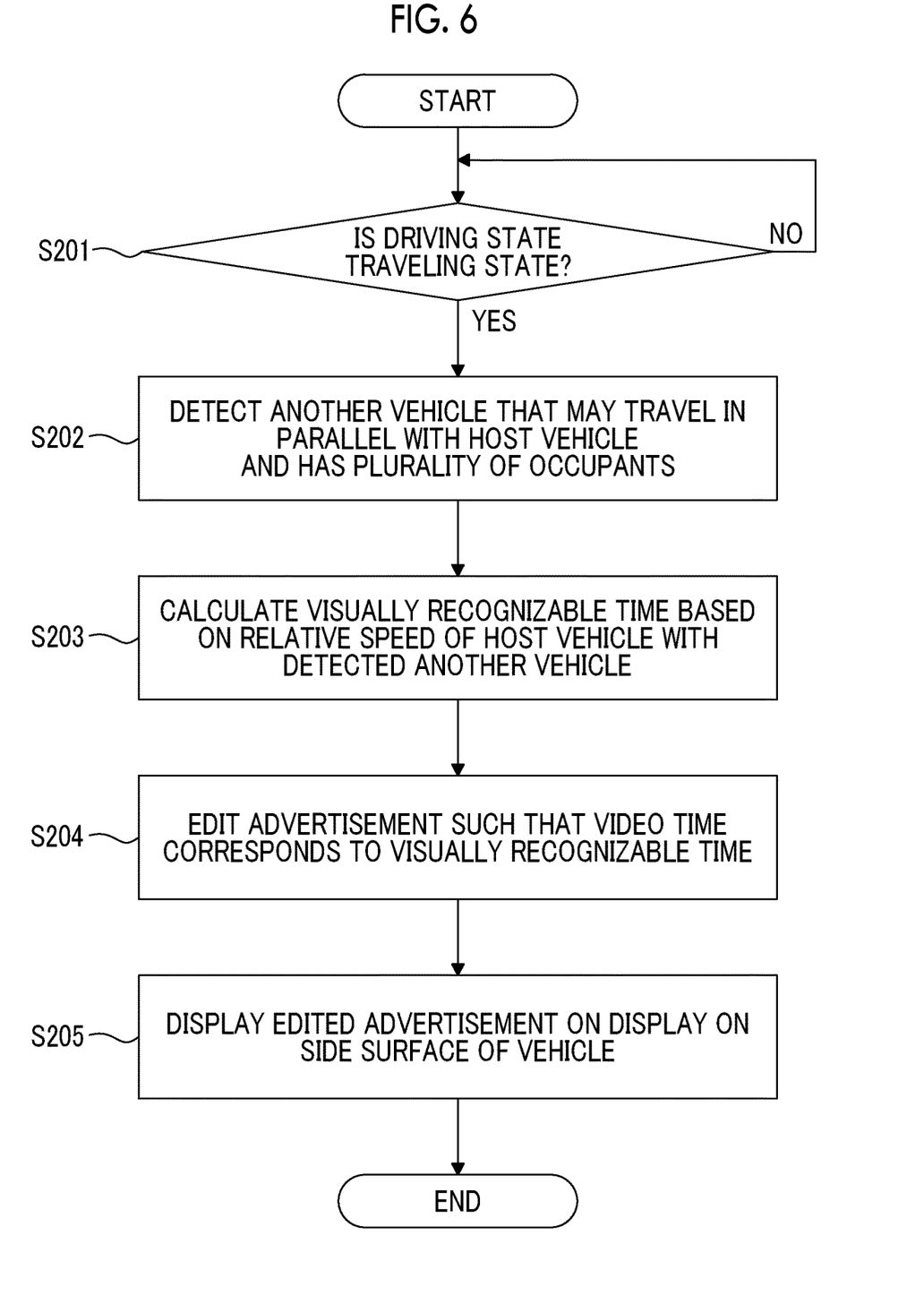
FIG. 6 is a flowchart for describing a procedure of an advertisement display process executed in the control device shown in FIG. 4.

An example of a procedure of an advertisement display process executed in the control device 2s of the second embodiment will be described with reference to FIG. 6.

First, the calculation unit 21s of the control device 2s determines whether or not the driving state of the host vehicle is the traveling state (step S201). When the determination is NO (step S201; NO), the determination is repeated until YES.

When determination is made in step S201 that the driving state is the traveling state (step S201; YES), the calculation unit 21s of the control device 2s detects another vehicle that may travel in parallel with the host vehicle and has the occupants (step S202).

Subsequently, the calculation unit 21 of the control device 2s calculates the visually recognizable time for the video displayed on the display 4 based on the relative speed of the host vehicle with another vehicle detected in step S202 (step S203).

Subsequently, the display controller 22 of the control device 2s edits the advertisement such that the video time corresponds to the visually recognizable time calculated in step S203 (step S204).

Subsequently, the display controller 22 of the control device 2s displays the advertisement edited in step S204 on the display 4 provided on the side surface of the host vehicle (step S205). Then, the operation ends.

As described above, with the control device 2s according to the second embodiment, it is possible to detect another vehicle that may travel in parallel with the host vehicle and has the occupants when the driving state of the host vehicle is the traveling state, to calculate the visually recognizable time based on the detected relative speed of the host vehicle with another vehicle, and to display the advertisement edited such that the video time corresponds to the calculated visually recognizable time on the display provided on the side surface of the host vehicle. Accordingly, it is possible to cause the occupant of another vehicle traveling in parallel with the host vehicle to view the advertisement edited to match a traveling time in parallel.

With the control device 2s in the second embodiment, it is possible to display an advertisement having a length matching the time for which another vehicle which is a viewing target travels in parallel with the host vehicle on the display provided on the side surface of the host vehicle and thus to transmit the contents desired to be advertised to a target viewer.

MODIFICATION EXAMPLE

The disclosure is not limited to the above embodiments and can be implemented in various other forms within the scope not departing from the gist of the disclosure. Therefore, each embodiment is solely a mere example in all points and is not interpreted limitedly. For example, the respective process steps described above can be randomly changed in order or can be executed in parallel as long as the process contents do not contradict.

The case where the display 4 is attached to the rear surface of the vehicle in the first embodiment and the case where the display 4 is attached to the side surface of the vehicle in the second embodiment are respectively described. However, the display 4 may be attached to both the rear surface and the side surface of the vehicle. In the case, the process of displaying the edited advertisement on the display 4 attached to the rear surface of the vehicle may be executed when the driving state of the vehicle shifts to the stop state, and the process of displaying the edited advertisement on the display 4 attached to the side surface of the vehicle may be executed when the driving state of the vehicle is the traveling state.

The constituent elements of the control devices 2 and 2s are not limited to the constituent elements in the above embodiments, and any constituent element can be appropriately added as necessary. Further, the functions of the control devices 2 and 2s are not limited to being realized by one server device and may be realized by distributing the functions to a plurality of server devices.

What is claimed is:

1. An advertisement display device that is mountable on a vehicle, the device comprising:
   a sensor or communicator attached to a host vehicle and configured to acquire a driving state of the host vehicle;
   a display attached to a rear surface of the host vehicle; and
   a processor programmed to:
      acquire the driving state of the host vehicle from the sensor or communicator;

determine that the host vehicle stops at a traffic signal that causes a stop state when the driving state of the host vehicle shifts to the stop state;

calculate a duration of the host vehicle being stopped at the traffic signal as a visually recognizable time that is a time for which an occupant of another vehicle is able to visually recognize a video displayed on the display, the duration of the host vehicle being stopped at the traffic signal being calculated based on information acquired by road-to-vehicle communication with a roadside device corresponding to the traffic signal when the driving state of the host vehicle shifts to the stop state;

determine whether or not the visually recognizable time is less than a reference time;

when the visually recognizable time is less than the reference time, instruct the display to display as a still image advertisement as a displayed advertisement; and when the visually recognizable time is not less than the reference time;
    edit a moving image advertisement such that its video time corresponds to the visually recognizable time; and
    instruct the display to display the edited moving image advertisement as the displayed advertisement.

2. The advertisement display device according to claim 1, wherein the processor is programmed to instruct the display to stop displaying the displayed advertisement when there is no other vehicle in a range where the displayed advertisement is visually recognizable.

3. The advertisement display device according to claim 1, further comprising:

a detector configured to detect another vehicle that is likely to travel in parallel with the host vehicle; and a side display attached to a side surface of the host vehicle;

wherein the processor is programmed to:
    calculate a side visually recognizable time based on a relative speed of the host vehicle and the other vehicle detected by the detector when the driving state of the host vehicle is a traveling state; and
    instruct the side display to display the displayed advertisement when the driving state of the host vehicle is the traveling state.

4. The advertisement display device according to claim 3, wherein the detector detects the other vehicle that is likely to travel in parallel with the host vehicle and has a plurality of occupants based on information acquired by vehicle-to-vehicle communication with the other vehicle.

5. The advertisement display device according to claim 3, further comprising:

a camera configured to capture a periphery of the host vehicle, wherein the detector recognizes an image captured by the camera to detect the other vehicle that is likely to travel in parallel with the host vehicle and has a plurality of occupants.

6. The advertisement display device according to claim 3, wherein the processor is programmed to calculate the relative speed of the host vehicle and the other vehicle based on information acquired by vehicle-to-vehicle communication with the other vehicle when the driving state of the host vehicle is the traveling state.

7. A vehicle comprising:

a sensor or communicator configured to acquire a driving state of the vehicle;

a display attached to a rear surface of the vehicle; and a processor programmed to:
    acquire the driving state of the vehicle from the sensor or communicator;
    determine that the vehicle stops at a traffic signal that causes a stop state when the driving state of the vehicle shifts to the stop state;
    calculate a duration of the vehicle being stopped at the traffic signal as a visually recognizable time that is a time for which an occupant of another vehicle is able to visually recognize a video displayed on the display, the duration of the vehicle being stopped at the traffic signal being calculated based on information acquired by road-to-vehicle communication with a roadside device corresponding to the traffic signal when the driving state of the host vehicle shifts to the stop state;
    determine whether or not the visually recognizable time is less than a reference time;
    when the visually recognizable time is less than the reference time, instruct the display to display a still image advertisement; and
    when the visually recognizable time is not less than the reference time:
        edit a moving image advertisement such that its video time corresponds to the visually recognizable time; and
        instruct the display to display the edited moving image advertisement.

8. An advertisement display method executed by a processor that is mountable on a vehicle, the method comprising:

acquiring a driving state of a host vehicle from a sensor or communicator attached to the host vehicle;

determining that the host vehicle stops at a traffic signal that causes a stop state when the driving state of the host vehicle shifts to the stop state;

calculating a duration of the host vehicle being stopped at the traffic signal as a visually recognizable time that is a time for which an occupant of another vehicle is able to visually recognize a video displayed on the display, the duration of the host vehicle being stopped at the traffic signal being calculated based on information acquired by road-to-vehicle communication with a roadside device corresponding to the traffic signal when the driving state of the host vehicle shifts to the stop state;

determining whether or not the visually recognizable time is less than a reference time;

when the visually recognizable time is less than the reference time, instructing the display to display a still image advertisement; and when the visually recognizable time is not less than the reference time:
    editing a moving image advertisement such that its video time corresponds to the visually recognizable time; and
    instructing the display to display the edited moving image advertisement.

* * * * *